US012554554B2

(12) United States Patent
Koya et al.

(10) Patent No.: US 12,554,554 B2
(45) Date of Patent: *Feb. 17, 2026

(54) MANAGEMENT INSTRUMENTATION AND DISCOVERY (MID) SERVER SUPPORT FOR EXECUTING AUTOMATED FLOWS WITHIN A CLOUD BASED SYSTEM

(71) Applicant: ServiceNow, Inc., Santa Clara, CA (US)

(72) Inventors: Venkata Kiran Kumar Koya, Poway, CA (US); Robert Peter-Paul Recatto, La Jolla, CA (US); Nicholas Michael Stark, San Diego, CA (US); Harry Thomas Nelson, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/339,654

(22) Filed: Jun. 22, 2023

(65) Prior Publication Data

US 2023/0333914 A1 Oct. 19, 2023

Related U.S. Application Data

(63) Continuation of application No. 17/007,249, filed on Aug. 31, 2020, now Pat. No. 11,720,415, which is a (Continued)

(51) Int. Cl.
*G06F 9/50* (2006.01)
*G06F 9/48* (2006.01)
*H04L 67/63* (2022.01)

(52) U.S. Cl.
CPC .......... *G06F 9/5088* (2013.01); *G06F 9/4881* (2013.01); *G06F 9/5044* (2013.01); (Continued)

(58) Field of Classification Search
CPC .... G06F 9/5088; G06F 9/4881; G06F 9/5044; G06F 9/505; G06F 9/5077; H04L 67/63
See application file for complete search history.

(56) References Cited

U.S. PATENT DOCUMENTS 5,978,594 A 11/1999 Bonnell
6,078,982 A 6/2000 Du et al.
(Continued)

*Primary Examiner* — Jacob D Dascomb
(74) *Attorney, Agent, or Firm* — FLETCHER YODER PC

(57) ABSTRACT

Executing and managing flow plans by performing at least the following: receiving an indication to initiate a task flow including a plurality of discrete but related operations at a customer instance environment of a cloud-based computing platform; obtaining a definition of the task flow identifying run-time requirements for each of the plurality of operations; determining a first execution environment for the first of the plurality of operations; initiating execution of the first operation in the first execution environment; and determining the proper execution environment for subsequent operations of the task flow until all operations of the task flow are complete. Factors, such as look-ahead optimization, environmental operational capabilities, access and security requirements, current load, future load, etc. may be considered when determining the proper execution environment for a given operation. Operations may be executed in environments hosted in the public cloud or in environments present in a dedicated private network.

20 Claims, 5 Drawing Sheets

Related U.S. Application Data continuation of application No. 15/939,587, filed on Mar. 29, 2018, now Pat. No. 10,761,903.

(52) U.S. Cl.
CPC ............ *G06F 9/505* (2013.01); *G06F 9/5077* (2013.01); *H04L 67/63* (2022.05)

(56) References Cited

U.S. PATENT DOCUMENTS

| | | | |
|---|---|---|---|
| 6,321,229 B1 | 11/2001 | Goldman | |
| 6,609,122 B1 | 8/2003 | Ensor | |
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,392,300 B2 | 6/2008 | Anantharangachar | |
| 7,610,073 B2 | 10/2009 | Fuimaono et al. | |
| 7,617,073 B2 | 11/2009 | Trinon | |
| 7,685,167 B2 | 3/2010 | Mueller | |
| 7,689,628 B2 | 3/2010 | Garg | |
| 7,752,599 B2 | 7/2010 | Takacsi-Nagy et al. | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidari | |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,151,261 B2 | 4/2012 | Sirota | |
| 8,224,683 B2 | 7/2012 | Manos | |
| 8,266,096 B2 | 9/2012 | Navarrete | |
| 8,346,752 B2 | 1/2013 | Sirota | |
| 8,380,645 B2 | 2/2013 | Kowalski | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,612,408 B2 | 12/2013 | Trinon | |
| 8,646,093 B2 | 2/2014 | Myers | |
| 8,674,992 B2 | 3/2014 | Poston | |
| 8,683,032 B2 | 3/2014 | Spinelli | |
| 8,689,241 B2 | 4/2014 | Naik | |
| 8,739,171 B2 * | 5/2014 | Krishnamurthy | ....... G06F 9/505 718/104 |
| 8,743,121 B2 | 6/2014 | De Peuter | |
| 8,745,040 B2 | 6/2014 | Kowalski | |
| 8,812,539 B2 | 8/2014 | Milousheff et al. | |
| 8,818,994 B2 | 8/2014 | Kowalski | |
| 8,832,652 B2 | 9/2014 | Mueller | |
| 8,887,133 B2 | 11/2014 | Behnia | |
| 8,907,988 B2 | 12/2014 | Poston | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,135,586 B2 | 9/2015 | Balko et al. | |
| 9,137,115 B2 | 9/2015 | Mayfield | |
| 9,239,857 B2 | 1/2016 | Trinon | |
| 9,261,372 B2 | 2/2016 | Cline | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 8/2016 | Kowalski | |
| 9,467,344 B2 | 10/2016 | Gere | |
| 9,534,903 B2 | 1/2017 | Cline | |
| 9,535,737 B2 | 1/2017 | Joy | |
| 9,613,070 B2 | 4/2017 | Kumar | |
| 9,631,934 B2 | 4/2017 | Cline | |
| 9,645,833 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 9,967,162 B2 | 5/2018 | Spinelli | |
| 10,002,203 B2 | 6/2018 | George | |
| 2005/0022164 A1 | 1/2005 | Takacsi-Nagy | |
| 2008/0134330 A1 | 6/2008 | Kapoor et al. | |
| 2009/0164755 A1 * | 6/2009 | Bell, Jr. | ................ G06F 9/3851 712/30 |
| 2010/0131669 A1 | 5/2010 | Srinivas et al. | |
| 2010/0174771 A1 | 7/2010 | Cobb | |
| 2011/0179470 A1 * | 7/2011 | Carley | .................... H04L 63/10 726/4 |
| 2013/0339419 A1 | 12/2013 | Emaru | |
| 2014/0201761 A1 * | 7/2014 | Dalal | ..................... H04L 67/10 718/108 |
| 2014/0282573 A1 * | 9/2014 | Clark | ....................... G06F 9/50 718/103 |
| 2018/0129713 A1 * | 5/2018 | Zhang | ............... G06F 16/24568 |
| 2019/0278938 A1 | 9/2019 | Greene et al. | |

* cited by examiner

MANAGEMENT INSTRUMENTATION AND DISCOVERY (MID) SERVER SUPPORT FOR EXECUTING AUTOMATED FLOWS WITHIN A CLOUD BASED SYSTEM

RELATED CASES

This application is a continuation of U.S. patent application Ser. No. 17/007,249, filed on Aug. 31, 2020, which is a continuation of U.S. patent application Ser. No. 15/939,587, filed on Mar. 29, 2018, now U.S. Pat. No. 10,761,903, issued on Sep. 1, 2020, the contents of each of which are incorporated by reference herein, in their entirety.

TECHNICAL FIELD

Embodiments described herein generally relate to cloud computing and, in particular, to executing and managing flow plans between a cloud-based customer instance environment and one or more management, instrumentation, and discovery (MID) server environments configured on a customer private network.

BACKGROUND

Cloud computing involves sharing of computing resources that are generally accessed via the Internet. In particular, the cloud computing infrastructure allows users, such as individuals and/or enterprises, to access a shared pool of computing resources, such as servers, storage devices, networks, applications, and/or other computing based services. By doing so, users are able to access computing resources located at remote locations in an "on demand" fashion in order to perform a variety computing functions that include storing and/or processing computing data. For enterprise and other organizational users, cloud computing provides flexibility in accessing cloud computing resources without accruing excessive up-front costs, such as purchasing network equipment and/or investing time in establishing a private network infrastructure. Instead, by utilizing cloud computing resources, users are able redirect their resources to focus on core enterprise functions.

In today's communication networks, examples of cloud computing services that a user may utilize include software as a service (SaaS) and platform as a service (PaaS) technologies. SaaS is a delivery model that provides software as a service, rather than as an end product. Instead of utilizing a local network or individual software installations, software is typically licensed on a subscription basis, hosted on a remote machine, and accessed as needed. For example, users are generally able to access a variety of enterprise and/or information technology (IT) related software via a web browser. PaaS acts an extension of SaaS that goes beyond providing software services by offering customizability and expandability features to meet a user's needs. For example, PaaS can provide a cloud-based developmental platform for users to develop, modify, manage and/or customize applications and/or automate enterprise operations—without maintaining network infrastructure and/or allocating computing resources normally associated with these functions.

Within the context of automating enterprise, IT, and/or other organization-related functions (e.g., human resources (HR)), PaaS often provides users an array of tools to implement complex behaviors, such as enterprise rules, scheduled jobs, events, and scripts, to build automated processes and to integrate with third party systems. Although the tools for PaaS generally offer users a rich set of facilities for building automated processes for various enterprise, IT, and/or other organization-related functions, users typically implement custom scripts to perform the automated process. Requiring customized script to build automated processes may pose a challenge when attempting to address different layers of complexity (e.g., providing domain-appropriate building blocks), code reuse (e.g., having defined application program interface (API) semantics), and/or codeless development. As such, continually improving the technology of developmental platforms that simplify the process for a user to design, run, and manage automated processes remains valuable in enhancing clouding computing services.

Achieving the correct balance between cloud-based resources and private network infrastructure devices remains a dynamic problem for some of today's enterprises. Some capabilities may only be able to function on a private network because access to resources required to perform that function may not be available on the cloud or may not accessed from the cloud because of security reasons or other factors. Disclosed embodiments address the problems mentioned above by describing an automated process, referred to as flow plans or task flows, that includes a plurality of operations and a determination of where to execute different operations to achieve a more optimal overall result. In particular, this disclosure addresses techniques and capabilities to dynamically allocate portions of the overall task flow to the appropriate run-time execution environment in either a cloud-based environment or an environment provided by private network infrastructure.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In a first example implementation according to embodiments of this disclosure, a cloud-based computer system for dispatching autonomous task flows of multiple operations across a plurality of operating environments, each having different execution capabilities, is described. In this example, the cloud-based computer system includes a memory partition and a network interface communicatively coupled to one or more processing units and the memory partition. The memory partition includes computer instructions that, when executed by the one or more processing units, cause the cloud-based computer system to: maintain a customer instance environment communicatively coupled to at least one management, instrumentation, and discovery (MID) server environment located in a customer private network; obtain a task flow definition comprising a plurality of operations, each operation representing a discrete portion of an overall task as identified in the task flow definition; receive an indication to initiate processing of the overall task at the customer instance environment; make a first determination, at the customer instance environment, of a proper execution environment for a first operation of the plurality of operations, the proper execution environment selected from the group consisting of: the customer instance environment, a MID server environment, and either the customer instance environment or the MID server environment; identify at least a first environment for execution of the first operation based on the first determination; receive an indication of a determined first environment for execution of the first operation; provide information sufficient to process at least a first portion of the task flow to the determined first environment if the selected first environment is not a current execution environment; provide an indication to initiate execution of the first operation in the determined first environment as the current execution environment; receive an indication of a second determination, from the current execution environment, the indication providing information that a second operation of the plurality of operations requires execution within an execution environment different from the current execution environment; identify at least a second environment for execution of the second operation based on the second determination; receive an indication of a determined second environment for execution of the second operation; provide information sufficient to process at least a second portion of the task flow to the second determined environment; provide an indication to initiate execution of the second operation in the second determined environment as the current execution environment; and repeat the acts of making a determination, receiving an indication, and providing information for each operation remaining in the plurality of operations.

The example may be extended such that the instructions further cause the computer system to analyze the plurality of operations of the overall task, prior to identifying at least a first environment, wherein the analysis may be directed to minimizing changes between execution environments. Alternatively or additionally, the instructions may further cause the computer system to make the first determination based on a comparison of a capability set of each potential proper execution environment and requirement attributes of the first operation. The instructions may also further cause the computer system to provide information for all operations of the task flow to the determined first execution environment when providing information sufficient to process at least a portion of the task flow. In this example, wherein the instructions to cause the one or more computer system to: make the first determination; identify at least the first execution environment; receive an indication of the determined first environment; provide information sufficient to process at least a first portion of the task flow; and provide an indication to initiate execution are all performed in the customer instance, and wherein execution of the first operation is initiated in the customer instance. Alternatively, the first operation could be initiated in a MID server environment.

In the above examples, the first determination of a proper execution environment may include: at least two possible MID server environments; the customer instance and at least one MID server environment; or the customer instance and all currently available MID server environments. A proper execution environment may be identified based on an attribute selected from the group consisting of: a data access requirement; an authorization credential requirement; and an application availability requirement, and the identification is made without regard to load or performance reasons. There may also be at least two independent messaging protocols that are present between a first task engine executing in the MID server environment and a second task engine executing in the customer instance.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
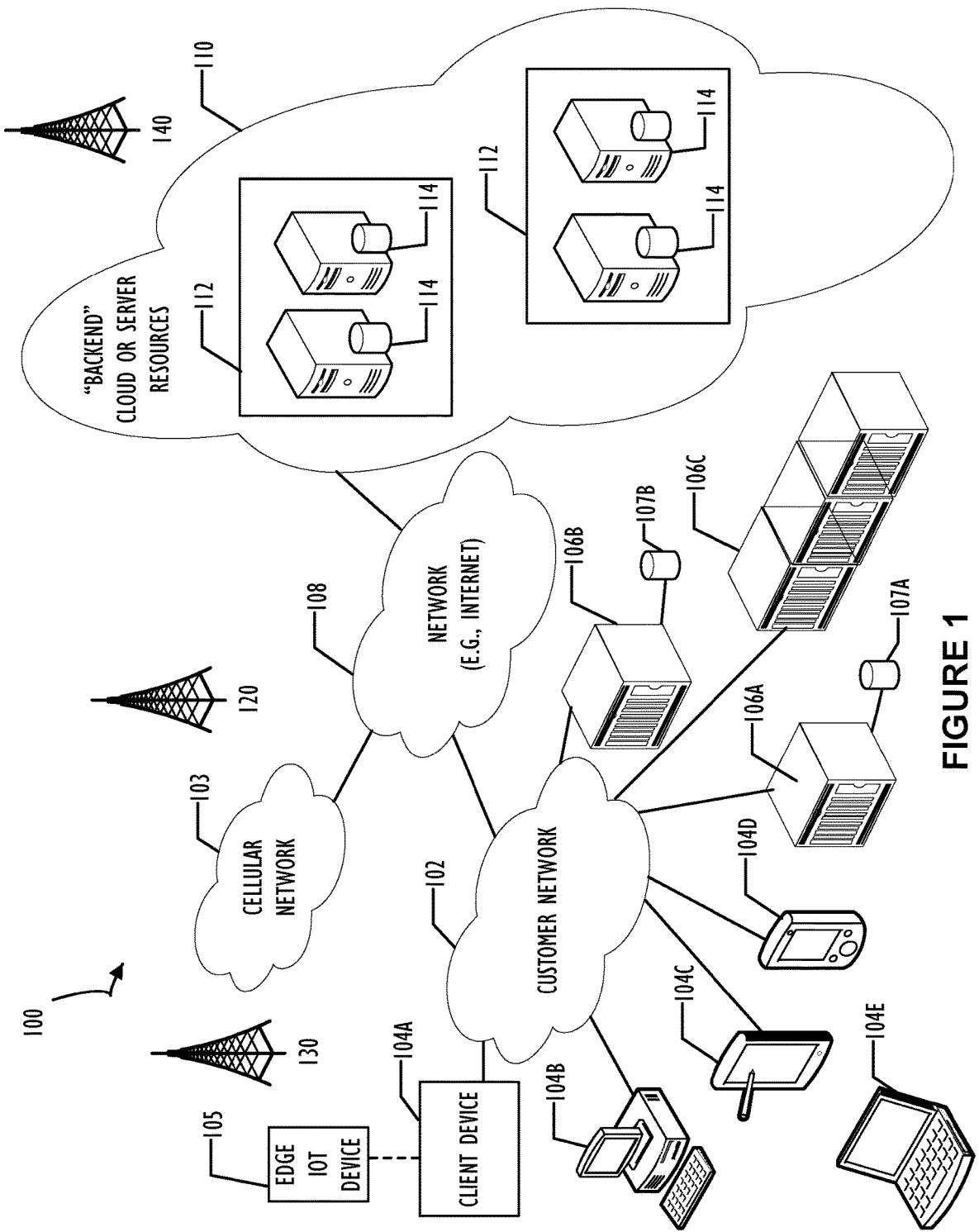
FIG. 1 illustrates a block diagram of an embodiment of a network infrastructure 100 that includes a cloud computing system and customer network (e.g., private network) where embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computing system" refers to a single electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the term "flow plan" refers to an overall definition of a configured, automated process for addressing one or more work functions that may be broken down into one or more discrete "operations." Each operation may include a logical unit of work that may be completed individually with the sum of all logical units of work (i.e., operations) representing the work of the "flow plan." As used herein, a "task flow" represents an individual instance of a flow plan, which may be thought of as a run-time copy of a corresponding flow plan. In one or more embodiments, the work functions for the flow plan may correspond to a variety of enterprise and/or other organization-relation functions. Categories of tasks that relate to enterprise and/or other organization functions include, but are not limited to HR operations, customer service, security protection, enterprise applications, IT management, and/or IT operation. In one embodiment, flow plans are created from a developmental platform, such as a Web 2.0 developmental platform written in Java® (JAVA is a registered trademark owned by Oracle America, Inc.) (e.g., Glide). Although, some task flows will remain within a single organizational domain such as HR operations (e.g., salary adjustment); other task flows may include operations that affect several organizational domains (e.g., employee termination may affect HR operations to perform the termination action, but may also invoke IT management and/or operations to disable user access accounts).

Using the disclosed techniques for dynamic assignments of operations within a task flow represents an improvement to the technology area of dispatching, load balancing, and flexibility of job scheduling techniques as used within multi-device computer networks. Disclosed techniques address a need to balance between private network infrastructure and cloud-based infrastructure to properly address distributed computing needs in the growing environment of SaaS and PaaS systems.

This disclosure also includes various example embodiments that execute portions (e.g., operations) of a task flow within a cloud computing environment and other portions (e.g., operations) of that same task flow within customer infrastructure that is part of a customer's private network. As an example, the customer instance (for a particular customer) may execute in the cloud computing environment and interact with MID servers that belong to the same customer. The MID servers may be located behind a firewall of the customer's private network and therefore have access (or at least more direct access) to other portions of a customer's private network, as will be discussed in further detail below with reference to FIG. 5. Once the automation system receives instructions to initiate execution of a task flow, that task flow may be selected from a plurality of flow plans. Next, a run-time version of the task flow, e.g., based on an execution data model, may be used to create a task flow definition (e.g., information to describe an active instance of a task flow). A flow engine may process the task flow definition to execute the run-time task flow, and operations thereof, on appropriate devices within the customer's total (i.e., cloud and private) infrastructure (e.g., hybrid infrastructure 500).

Flow engines may reside in many different locations throughout the customer's total infrastructure (e.g., hybrid infrastructure 500) and communicate with other flow engines to coordinate processing of each active task flow definition. Coordinating processing may include the following operations: determining proper execution environments; facilitating transfer of operations and their execution requirements between different execution environments as the "proper" execution environment dynamically changes; and maintaining status of in-progress and completed task flows. While a task flow is active, different operations within the task flow definition may require different execution environments to function properly—or more optimally. In some cases, a subset of operations of a task flow definition may be agnostic to their execution environment and may function equally well in all possible execution environments. In still another case, some operations may have attributes of their definition that favor one environment over another even though both environments may be able to properly execute the operation. Many combinations and permutations of operations and execution environments are possible, so long as compliance with the respective requirements of each operation is maintained. Thus, it would be desirable to optimize the overall task flow execution by selecting the proper execution environment dynamically, e.g., while the task flow is being processed, because operational attributes regarding load, capacity, and/or availability of execution environments may change after the initiation of the task flow. This may be especially true for any long-running task flow definitions.

Having an understanding of the above brief overview of task flows, operations, execution environments, and hybrid infrastructure 500 which may be included as a portion of network infrastructure 100, more detailed examples and embodiments are explained with reference to the drawings as necessary.

An integration to an enterprise system to support task flows may be referred to herein as an integration hub and may be configured to support a multitude of external systems to a cloud-based enterprise system. Often times, these external systems may be behind customer firewalls that require use of an internal server (e.g., a MID server on the customer private network) to complete the integration. In a typical customer setup, there may be multiple MID servers with access to different systems, and each MID server (or portion thereof) may vary between development, "Sub Prod" (e.g., a test environment), and production environments.

Accordingly, it may be important to select a correct MID server to perform portions of task flow at execution (e.g., during run-time). As mentioned above, depending on the requirements of a given operation of a task flow, the proper execution environment may be different because there may be environments having different execution capabilities. In one example, an operation can run only on the customer instance (e.g., approvals and/or cloud-service provider-specific operations), only on a specific MID server (e.g., a MID server configured with PowerShell operations, or REST), or the operation may be agnostic, i.e., able to be executed in any environment (e.g., a logging operation that is globally available). A customer may supply attributes within the flow plan for each operation to be used as filters and assist in making appropriate determinations based on capability requirements for the operation. Alternatively, the system may analyze the underlying information of each operation and populate attributes to assist in execution environment determination at run-time. In general, a task flow engine (such as that described with reference to FIG. 5) may obtain a request for operation execution and determine the proper environment for execution. If the run-time environment required (or desired) is different from the current execution environment, the operation, as well as control of the active task flow definition, may be shifted to the determined proper execution environment (e.g., another MID server or Customer Instance). In one embodiment, the task flow engine may "optimistically" provide the entire incomplete plan to the next environment to continue execution of the flow definition. This allows each task flow engine to possibly take advantage of running consecutive actions that require the same environment until it can no longer continue, thereby avoiding constant shifting between environments or shifting back to a control engine merely to determine if it can continue processing.

Examples of specific capabilities that may be only available in particular MID server environments can include Amazon Web Services (AWS), Active Directory, AWS—East, IP ranges a MID can talk to, and MID server connections to a certain application group (e.g., Discovery, Event management) so that a particular MID server is specifically used for that application. Further, a MID server in a development environment might be able to talk to all the systems but in a production environment, that same MID server may only be able to talk to a set of systems based on network or certain other security constraints. These constraints warrant selection of a correct MID server at run-time for each integration operation based on the MID server setup. To decouple this run-time selection data from design-time, in one embodiment, connection alias and connection data may be used. When designing flows, a user only needs to associate an alias that gets resolved to a connection data (e.g., credentials) during run-time. Connection data may be comprised of integration critical data, such as host identification, credential information, and/or MID specific configuration attributes (including capabilities required and application availability). Using host identification, capabilities, and/or application, as defined in a connection record, this embodiment may try to select a MID server that has a matching set of configuration attributes (e.g., IP range, capabilities, application).

In some embodiments, there may be multiple communication paths between different task flow engines that may be used for different purposes. For example, as part of one embodiment of an IntegrationHub, there can be a REST API to facilitate communication between a task flow engine on a MID server to transmit/receive information with the task flow engine on the customer instance. This communication path may be used either to retrieve plan data to run, push plan data to the customer instance when required, push logs, or to share usage metrics directly with the customer instance (i.e., instead of using a message queue, such as an External Communication Channel message queue (ECC queue)). In this embodiment, the ECC queue may be used to notify any selected MID server of the context ID for the plan to be picked up. Once a MID server has finished executing a plan (or operation of a plan), that MID server may write back an ECC queue entry to mark the execution complete. Any errors pertaining to the execution on the MID server may be reported separately via the REST API. Overall, this approach of providing multiple paths may improve fault tolerance, while also reducing load and dependency on the message queue. In one embodiment, all the logs generated on each MID server as part of this flow may be collected and pushed to the customer instance in addition to being logged on each MID server. Accordingly, information pertaining to the execution of each operation may be shown in the customer instance, and execution details may be viewed from a single source (i.e., rather than being split between customer instance and MID server). All collected logs may also be stored in a central database table (e.g., sys_flow_log table) that may be made visible in any operation view (e.g., end-user portal or user interface).

FIG. 1 illustrates a block diagram of an embodiment of network infrastructure 100 that includes a set of networks where embodiments of the present disclosure may operate. Network infrastructure 100 comprises a customer network 102, network 108, and a cloud service provider network 110. In one embodiment, the customer network 102 may be a local private network, such as local area network (LAN) that includes a variety of network devices that include, but are not limited to, switches, servers, and routers. Each of these networks can contain wired or wireless programmable devices and operate using any number of network protocols (e.g., TCP/IP) and connection technologies (e.g., WiFi® networks (WI-FI is a registered trademark of the Wi-Fi Alliance), Bluetooth® (BLUETOOTH is a registered trademark of Bluetooth Special Interest Group)). In another embodiment, customer network 102 represents an enterprise network that could include or be communicatively coupled to one or more local area networks (LANs), virtual networks, data centers and/or other remote networks (e.g., 108, 110).

As shown in FIG. 1, customer network 102 may be connected to one or more client devices 104A-E and allow the client devices 104A-E to communicate with each other and/or with cloud service provider network 110, via network 108 (e.g., Internet). Client devices 104A-E may be computing systems such as desktop computer 104B, tablet computer 104C, mobile phone 104D, laptop computer (shown as wireless) 104E, and/or other types of computing systems generically shown as client device 104A. Network infrastructure 100 may also include other types of devices generally referred to as Internet of Things (IoT) (e.g., edge IOT device 105) that may be configured to send and receive information via a network to access cloud computing services or interact with a remote web browser application (e.g., to receive configuration information). FIG. 1 also illustrates that customer network 102 includes local compute resources 106A-C that may include a server, access point, router, or other device configured to provide for local computational resources and/or facilitate communication amongst networks and devices. For example, local compute resources 106A-C may be one or more physical local hardware devices, such as a MID server, that facilitate communication of data between customer network 102 and other networks such as network 108 and cloud service provider network 110. Local compute resources 106A-C may also facilitate communication between other external applications, data sources (e.g., 107A and 107B), and services, and customer network 102. In network infrastructure 100, local compute resource 106A represents a MID server with singular access to data source 107A. That is, 107A is private data to MID server 106A in this example. Accordingly, any operation that requires access to data source 107A must execute on MID server 106A. Similarly, in this example, data source 106B is dedicated to MID server 106B. Local compute resource 106C illustrates a MID server cluster with three nodes. Of course, any number of nodes is possible, but three are shown in this example for illustrative purposes. In the context of the current disclosure, this example illustrates that those three nodes may be considered equivalent to each other as far as capabilities to perform operations designated for MID server 106C. It is noted that internal load balancing mechanisms (e.g., cluster load balancing) may further assist the overall operation assignment techniques used for optimal task flow execution according to disclosed embodiments.

Network infrastructure 100 also includes cellular network 103 for use with mobile communication devices. Mobile cellular networks support mobile phones and many other types of mobile devices such as laptops etc. Mobile devices in Network infrastructure 100 are illustrated as mobile phone 104D, laptop computer 104E, and tablet computer 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resources 106A-C). In addition, the mobile devices may interact other mobile devices or with non-mobile devices such as desktop computer 104B and various types of client device 104A for desired services. Although not specifically illustrated in FIG. 1, customer network 102 may also include a dedicated network device (e.g., gateway or router) or a combination of network devices (not shown) that implement a customer firewall or intrusion protection system.

FIG. 1 illustrates that customer network 102 is coupled to a network 108. Network 108 may include one or more computing networks available today, such as other LANs, wide area networks (WAN), the Internet, and/or other remote networks, in order to transfer data between client devices 104A-D and cloud service provider network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio based network as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud service provider network 110 is illustrated as a remote network (e.g., a cloud network) that is able to communicate with client devices 104A-E via customer network 102 and network 108. The cloud service provider network 110 acts as a platform that provides additional computing resources to the client devices 104A-E and/or customer network 102. For example, by utilizing the cloud service provider network 110, users of client devices 104A-E may be able to build and execute applications, such as automated processes for various enterprise, IT, and/or other organization-related functions. In one embodiment, cloud service provider network 110 includes one or more data centers 112, where each data center 112 could correspond to a different geographic location. Within a particular data center 112, a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to a web server instance (e.g., a unitary Apache installation), an application server instance (e.g., unitary Java® Virtual Machine), and/or a database server instance (e.g., a unitary MySQL® catalog (MySQL® is a registered trademark owned by MySQL AB A COMPANY)).

To utilize computing resources within cloud service provider network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances (not shown in FIG. 1) are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer into a customer instance executing on that single server instance. In a multi-tenant environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causes outages for all customers allocated to the single server instance 114. Accordingly, different redundancy techniques may be used to alleviate this potential issue. Embodiments of this disclosure are not limited to any particular implementation of cloud resource. Instead, the disclosed embodiments may function in a similar manner and share operation workload (e.g., operations) for a task flow between compute resources on a customer private network (e.g., 102) and a corresponding customer instance provided in cloud service provider network 110.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the cloud service provider network 110, and customer-driven upgrade schedules.

Details of a design environment for task flows is discussed in U.S. patent application Ser. No. 15/814,967, entitled, "User Interface for Automated Flows within a Cloud Based Developmental Platform," by Rebecca Dias, et al.; U.S. patent application Ser. No. 15/723,011, entitled, "Data Modelling and Flow Engine for Building Automated Flows within a Cloud Based Developmental Platform," by Harry Thomas Nelson et al.; and U.S. patent application Ser. No. 15/815,476, entitled, "User Interface For Automated Flows within a Cloud Based Developmental Platform," by Harry Thomas Nelson et al., each of which is incorporated by reference in its entirety herein for all applicable purposes. A summary of the design environment as it relates to this disclosure and the creation and maintenance of flow plans is provided here. Following this overview of the design environment, details of an execution environment and coordination of operations of a run-time flow plan are discussed in more detail with reference to FIGS. 3-5.

Figure 3:
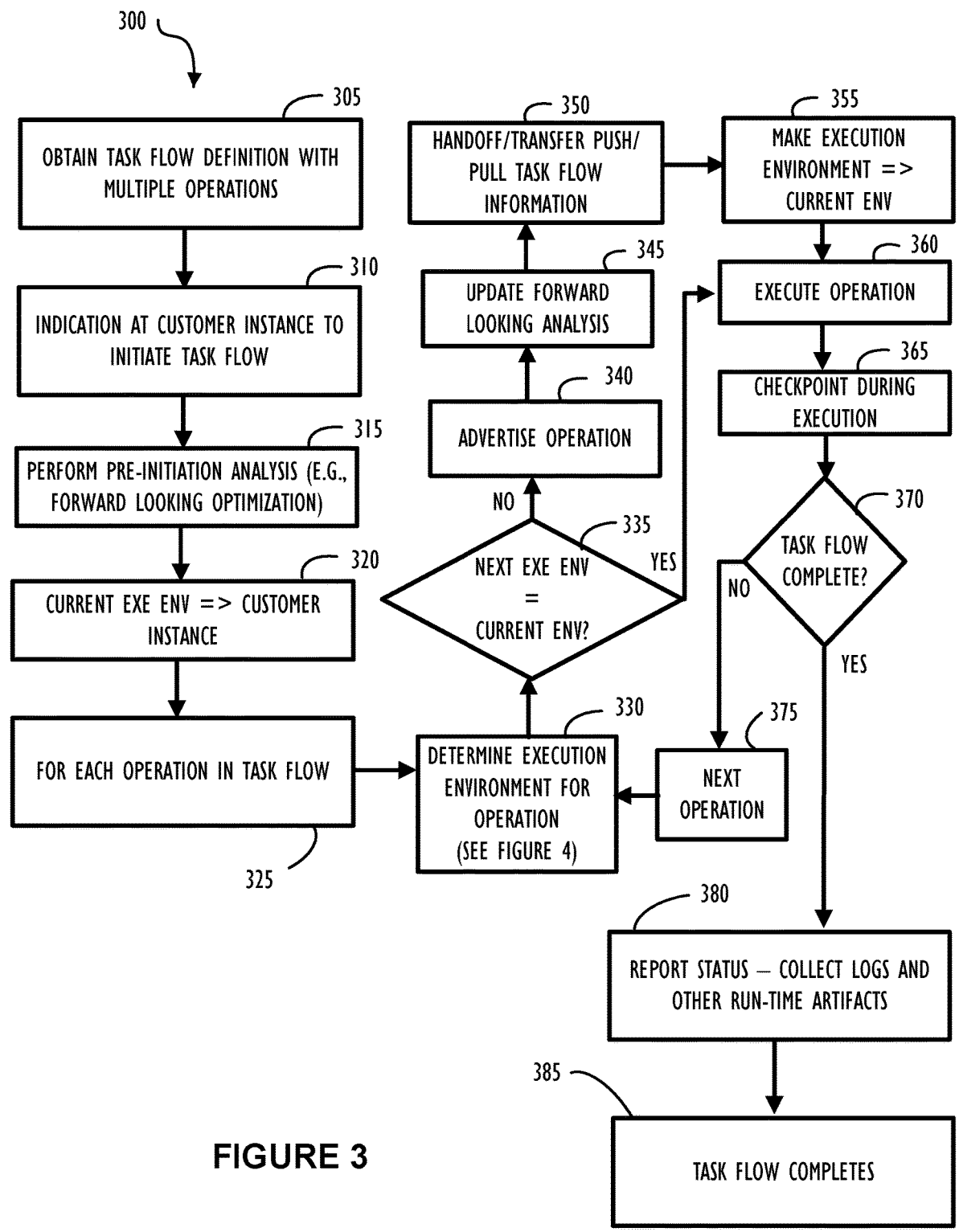
FIG. 3 is a flow chart for operation 300 illustrating one possible method for processing a plurality of operations in different execution environments that are determined dynamically while executing a task flow according to one or more disclosed embodiments.

In one embodiment, utilizing a multi-instance cloud architecture, a customer instance may be configured to utilize an automation system (not shown in FIG. 1) that creates, saves, updates, manages and/or executes flow plans. In particular, the automation system can create and update design-time flow plans and subsequently convert the design-time flow plan into a run-time flow plan for execution. As used herein, the term "design-time flow plan" refers to a flow plan built during the creation phase and prior to being converted (e.g., compiled) by a flow plan builder API. In one embodiment, the design-time flow plan contains one or more trigger instances, action instances, and step instances. A trigger instance refers to a process that initiates when a certain condition or event is met (e.g., a record matching a filter is changed, a timer expires, and an inbound REST call arrives). An action instance refers to one or more step instances (e.g., a sequence of step instances) that processes some defined set of input values to generate a defined set of output values. The action instances can be linked together and along with the trigger instance to form the design-time flow plan. During the flow plan execution phase, the automation system may execute a run-time version of the design-time flow plan (e.g., a task flow) using one or more flow engines. As used herein, the term "run-time flow plan," or simply "task flow," refers to a run-time engine implementation of a flow plan operating during execution phase and after being converted (e.g., compiled) by a flow plan builder API. In one embodiment, the run-time flow plan can be implemented as Java® Script Object Notation (JSON) document that includes a plurality of definitions. FIG. 3, which is discussed in detail below, illustrates an example of a design-time flow plan and a run-time flow plan.

In reference to the flow plan creation phase, in one embodiment, the automation system includes an automation user interface system for creating a design-time flow plan. The automation user interface system may utilize a flow designer user interface, an action designer user interface, and construction API to drive a data model that represents the design-time flow plan. A user may use the automation user interface system to create new design-time flow plans and/or update an already existing design-time flow plan. The new design-time flow plans and/or changes made to existing design-time flow plans are stored as data models within in a database located in the cloud service provider network 110. When a user is satisfied with the created and/or updated design-time flow plan, the user can subsequently publish the design-time flow plan. During publication of the design-time flow plan, a flow builder API coverts (e.g., compiles) the stored data model into a run-time flow plan that a flow engine within the cloud service provider network 110 and/or local compute resource 106 executes.

The flow designer user interface may be configured for a user to create and modify a human-readable version of the design-time flow plan. The flow designer user interface can include trigger indicators, action indicators, and step indicators representative of the design-time flow plan's trigger, action, and step instances, respectively. In one embodiment, each of the indicators may be a graphical representations, such as graphical icons, where different graphic icons could represent the different types of trigger, action, and/or step instances. The flow designer user interface may connect and arrange the indicators based on how data routes amongst the trigger, action, and step instances. As an example, a flow designer user interface may link a trigger indicator to a given action indicator when the output values of the corresponding trigger instance are linked to input values for the given corresponding action instance. The flow designer user interface may also include labels (e.g., characters, numbers, and other text) that represent whether each indicator corresponds to a trigger instance, action instance, or step instance. Additionally or alternatively, the flow designer user interface may include annotations that summarize the functional operations for each of the indicators and/or provide user added commentary for the design-time flow plan. In one or more embodiments, the flow designer user interface may also include a test indicator that allows a user to test and simulate a flow plan based on user supplied inputs. Additionally or alternatively, the flow designer user interface may also allow a user to select and reuse pre-existing or copied action instances (e.g., action instances associated with a third party system) when adding action instances within a design-time flow plan.

A user may be able to access the action designer user interface to create, reuse, and/or modify action and step instances of the design-time flow plan. In one embodiment, a user may be able to access the action designer user interface from the flow designer user interface. When designing an action instance, a user creates a specific action type by including one or more step instances within a sequence. A user is able to add or modify step instances by selecting from a list of pre-existing step types that include, but are not limited to creating tasks, creating records, updating records, looking up records, creating approvals, deleting records, sending emails, performing a REST web service request, creating custom script, and triggering a notification. A user may also be able to set the action instance's inputs, outputs, and run-time capability requirements, with the action designer user interface. The user may also be able to provide attributes for either a required or desired execution environment for operations within a given design-time flow plan. These user provided attributes may be treated as either a requirement or a preference depending on the type of attribute provided by the user.

As an example, the action designer user interface may be able to create an approval step instance within an action instance without the use of customized script or code. To avoid customized script or code, the action designer user interface may include an approval rule builder that sets one or more rules that create an approval condition for the approval step instance. Subsequent step instances linked to the approval step instance may not execute until the flow plan receives an expected instruction (e.g., approval or rejection instruction) to evaluate the approval condition. For example, the action designer user interface may set an approval condition, whereby a flow plan needs to manually receive an approval or rejection instruction from a specified user. Until the specified user sends out the approval or rejection instruction, the flow plan is in a wait state and does not execute any subsequent action and/or step instances. The approval rule builder may be configured to setup rules that allows a list of users, a list of groups, or a dynamic group to provide instructions (e.g., approval or rejection instructions) to an approval step instance. In one embodiment, the action designer user interface may be able to create an auto approve function that approves the approval step instance if no instructions are sent to handle the approval condition.

The automation system may store the design-time flow plan that a user builds with the flow designer user interface and action designer user interface as a data model. The data model represents the design-time flow plan and instances using flow plan entities, trigger entities, action entities, and step entities. The action entities and step entities within the data model may include action types and step types that define each of the action instances and step instances. For example, an action instance may be associated with an action type that the data model defines by its inputs, outputs, and associated step instances, where each step instance is of a certain step type. The data model may also describe how data routes between the step instances within an action type and between trigger and action instances within a flow. In one embodiment, the data model represents the flow plan entities, trigger entities, action entities, and step entities as a set of relational tables organized within multiple hierarchal layers.

To enter the flow plan execution phase, the automation system may compile or otherwise transform the data model representation of the design-time flow plan after receiving a publish instruction via the automation user interface system. During the flow plan execution phase, the flow engine within the cloud service provider network 110 executes run-time flow plans that that may be represented as directed acyclic graphs of operations that move data between operation nodes (e.g., execution environments) in a declarative manner as each operation completes. Each operation node in the run-time flow plan may have data signatures defining input and output values. Input values may be fixed values (e.g., hard coded to specific values), registered as an observer of a previous operation node, left unassigned, or a combination thereof. Operation nodes may also be registered as a descendent of a previous node. In one embodiment, a flow engine executes an operation at an execution environment of an operation node once the operation node's input values have been supplied and once, if any, of the operation node's ancestor operation nodes have completed successfully. In one embodiment, operations can be written in Java® by extending a base operation class, where the contract is to implement a run method and declare data signatures. The flow engine can opaquely execute (e.g., independently execute) certain operations within the flow plan and propagate data values based on the execution of the operations. Operations can also be synchronous or asynchronous by design and can be configured to execute in a single and/or multiple threads.

In one or more embodiments, the flow engine may support conditional logic (e.g., looping and branching) and iterations by implementing a messaging framework that creates dynamic mutation operations that are tied to a specific message and/or instruction. The flow engine may include a messaging API that allows messages and/or instructions to be sent to one or more dynamic mutation operations in a run-time flow plan. If at least one of the dynamic mutation operations has a listening operation that matches a specific received message and/or instruction, the dynamic mutation operation can be marked as ready to execute. Stated another way, dynamic mutation operation within a run-time flow plan can be configured to allow and/or create additional specific action instance or step instance to execute when the dynamic mutation operations receives the message and/or instruction. For example, the flow engine may implement a callback type of functionality such that every time the dynamic mutation operation receives a message, a new callback operation is generated and added to the run-time flow plan. In particular, the flow engine may add operations into the run-time flow plan each time one or more message handlers within the flow engine receives the message.

Additionally, the messaging framework may also support executing at least a portion of the run-time flow plan on separate computing device. Using FIG. 1 as an example, a computing device associated with customer network 102, such as local compute resources 106A-C, can execute at least a portion of the run-time flow plan. In this embodiment, the automation system includes additional flow engines located on the local compute resources 106A-C. Other embodiments of the automation system may use other secondary execution environments besides a local compute resources 106A-C. The automation system may be able to offload the execution of the run-time flow plan to local compute resources 106A-C in situations where the customer instance is unable to perform certain operations within the flow plan and/or would require too much computational resources. For example, the automation system may offload portions of the flow plan to local compute resources 106A-C in order to obtain data and/or transfer data to other server instances 114 that the customer instance does not have permission to access.

The automation user interface system may also include an operational view user interface that provides configuration and run-time information for an executing and/or completed flow plan. In one or more embodiments, the operational view user interface may provide configuration and run-time information of executing and/or completed flow plans while a user simultaneously modifies the corresponding flow plans within the one or more other user interfaces. The operational view user interface may include one or more state indicators that provide the overall state of a flow plan and the state of a trigger instance and/or one or more action instances. Examples of state indicators include a "wait" state, "not run" state, a "completed" state, and a "failed" state. For example, the state indicators may reveal that a flow plan is overall currently in a "wait" state, where one or more action and/or step instances could have finished execution, has yet to run, failed, or currently in a "wait" state. The operational view user interface may also provide other metrics relating to the execution of the trigger instances, action instances, and/or step instances, such as the start time for each of the instances and the amount of time to complete the execution of the different instances. Additionally, the operational view user interface may be able to expand selected action and/or step instances to provide more detail. As an example, if the step instances is to create a task within a virtual task board (VTB), then expanding the create VTB task step instance could provide run-time values and the ability to link back to the VTB record. In some cases, the operational view user interface may provide a preview window to view the VTB record prior to opening the link to the VTB record.

The automation system within the cloud service provider network 110 can create and execute flow plans that support a broad-range of uses cases pertaining to automating enterprise, IT, and/or other organization-related functions. The automation system may also be able to accommodate different user personas, such as IT workers and programmers to process-orientated non-IT line of enterprise customers. For example, one use case involves creating and executing a flow plan pertaining to security incident notification. In this use case, a user can design the flow plan's trigger to initiate when a recorded incident is created in a specific security category. In response to this trigger, the flow plan creates a task for the Security Response Team to immediately investigate the incident, and send potential security breach notifications. Additionally, the flow plan may as provide that when the Security Response Team closes out the created task, the recorded incident is updated with the finding of the Security Response Team. In another use case example, an HR department of an organization wants to create and execute a flow plan for a pre-on boarding process that creates employee records, sends out reminder notifications, and creates user accounts of various systems. HR personnel may want to configure created employee records via a client device using an HR application as well as configuring what notifications need to be sent and when. Using the automation system, the HR application can construct pieces of the flow plan from the HR application's internal data model, create triggers that execute the various tasks when required, and have the flow plan start actions to create to appropriate records when a person is ready to start work.

Figure 2:
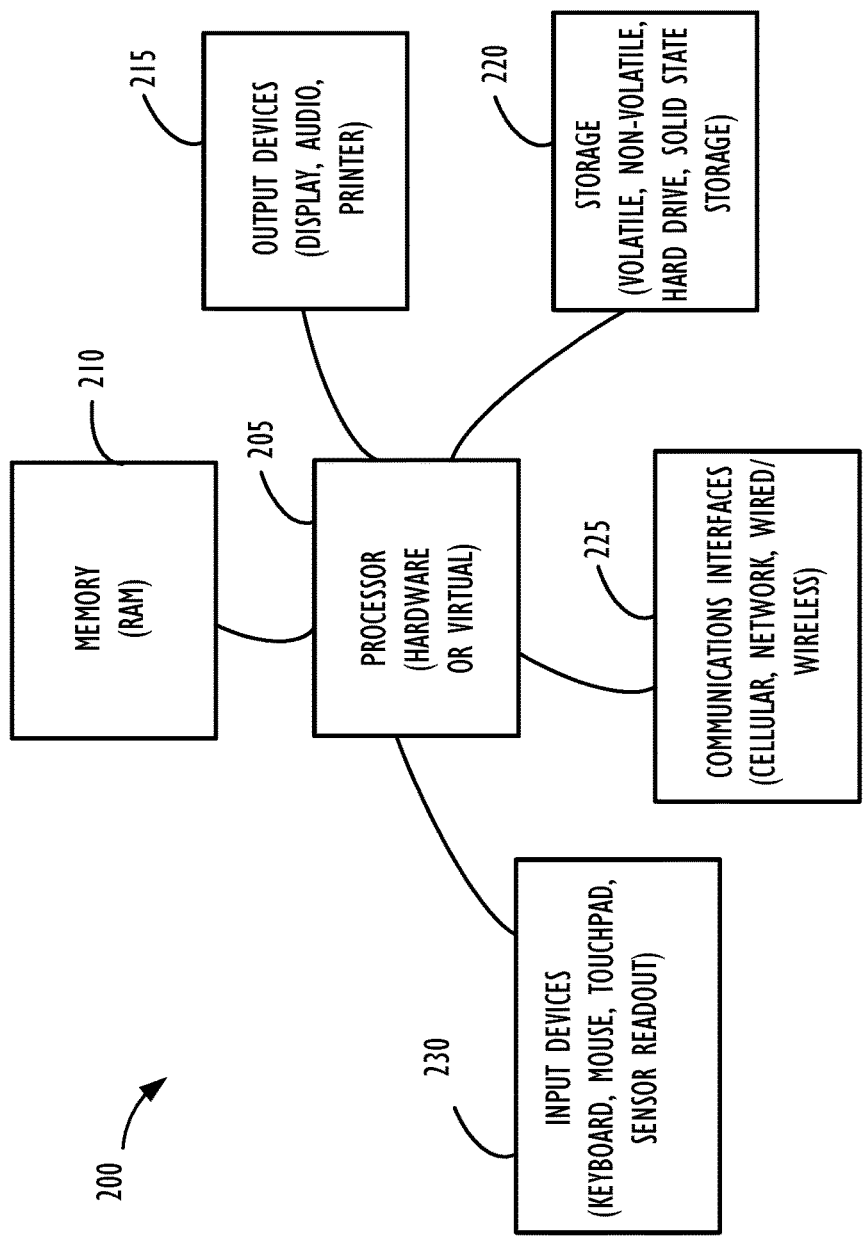
FIG. 2 illustrates a block diagram of a computing device 200 that may be used to implement operations described as being performed, for example, by a computer system or processing device according to one or more disclosed embodiments.

FIG. 2 illustrates a block diagram of a computing device 200 that may be used to implement one or more disclosed embodiments (e.g., network infrastructure 100, client devices 104A-104E, etc.). For example, computing device 200 illustrated in FIG. 2 could represent a client device or a physical server device and include either hardware or virtual processor(s) depending on the level of abstraction of the computing device. In some instances (without abstraction), computing device 200 and its elements, as shown in FIG. 2, each relate to physical hardware. Alternatively, in some instances one, more, or all of the elements could be implemented using emulators or virtual machines as levels of abstraction. In any case, no matter how many levels of abstraction away from the physical hardware, computing device 200 at its lowest level may be implemented on physical hardware. As also shown in FIG. 2, computing device 200 may include one or more input devices 230, such as a keyboard, mouse, touchpad, or sensor readout (e.g., biometric scanner) and one or more output devices 215, such as displays, speakers for audio, or printers. Some devices may be configured as input/output devices also (e.g., a network interface or touchscreen display). Computing device 200 may also include communications interfaces 225, such as a network communication unit that could include a wired communication component and/or a wireless communications component, which may be communicatively coupled to processor 205. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 2, computing device 200 includes a processing element such as processor 205 that contains one or more hardware processors, where each hardware processor may have a single or multiple processor cores. In one embodiment, the processor 205 may include at least one shared cache that stores data (e.g., computing instructions) that are utilized by one or more other components of processor 205. For example, the shared cache may be a locally cached data stored in a memory for faster access by components of the processing elements that make up processor 205. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 2, the processing elements that make up processor 205 may also include one or more other types of hardware processing components, such as graphics processing units (GPU), application specific integrated circuits (ASICs), field-programmable gate arrays (FPGAs), and/or digital signal processors (DSPs).

FIG. 2 illustrates that memory 210 may be operatively and communicatively coupled to processor 205. Memory 210 may be a non-transitory medium configured to store various types of data. For example, memory 210 may include one or more storage devices 220 that comprise a non-volatile storage device and/or volatile memory. Volatile memory, such as random access memory (RAM), can be any suitable non-permanent storage device. The non-volatile storage devices 220 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 220 may be used to store overflow data if allocated RAM is not large enough to hold all working data. The non-volatile storage devices 220 may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processor 205. In one embodiment, the compiling process of the software program may transform program code written in a programming language to another computer language such that the processor 205 is able to execute the programming code. For example, the compiling process of the software program may generate an executable program that provides encoded instructions (e.g., machine code instructions) for processor 205 to accomplish specific, non-generic, particular computing functions.

After the compiling process, the encoded instructions may then be loaded as computer executable instructions or process steps to processor 205 from storage device 220, from memory 210, and/or embedded within processor 205 (e.g., via a cache or on-board ROM). Processor 205 may be configured to execute the stored instructions or process steps in order to perform instructions or process steps to transform the computing device into a non-generic, particular, specially programmed machine or apparatus. Stored data, e.g., data stored by a storage device 220, may be accessed by processor 205 during the execution of computer executable instructions or process steps to instruct one or more components within the computing device 200.

A user interface (e.g., output devices 215 and input devices 230) can include a display, positional input device (such as a mouse, touchpad, touchscreen, or the like), keyboard, or other forms of user input and output devices. The user interface components may be communicatively coupled to processor 205. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 200 may comprise other components well known in the art, such as sensors, powers sources, and/or analog-to-digital converters, not explicitly shown in FIG. 2.

Referring now to FIG. 3, a flow chart is illustrated to represent operation 300 for one possible method to process a plurality of operations in different execution environments that are determined dynamically while executing a task flow, according to one or more disclosed embodiments. Beginning at block 305, a task flow definition with multiple operations is obtained. As explained above, each operation may represent a discrete and segregated portion of work that may be performed in a "proper" execution environment. The sum of all operations represents the complete work for a given task flow. A proper execution environment may be different for the different operations and may be dependent on instantaneous factors, such as current load, or may be dependent on immutable parameters, such as a compute resource operational capability. Block 310 indicates that a customer instance (e.g., a customer instance in cloud service provider network 110) may receive or provide an indication to initiate a task flow for execution. Block 315 indicates that optional pre-initiation analysis may be performed. For example, a task flow engine (as is described below, with reference to FIG. 5) may analyze the entire task flow to group operations into sets of operations that may be more efficient to execute in the same execution environment. The "forward looking" analysis may make a prediction of what operating environments should be selected for each operation within a task flow, assuming that load conditions within the hybrid infrastructure (e.g., network infrastructure 100) do not change during execution of this task flow. Block 320 indicates that, as an initial default setting, the current execution environment is set to equal the customer instance. Block 325 indicates that a loop function may then be entered to determine how (e.g., where) to execute each operation from the task flow definition.

This "for each" loop begins at block 330, where a determination may be made as to the "proper" execution environment for the current (in this initial case first) operation of the task flow definition. Details of one example method to make this determination are discussed below with reference to FIG. 4. Flow continues to decision 335 where it is determined if the next execution environment (i.e., execution environment for operation about to execute) is equal to the current execution environment. If so, the YES prong of decision 335, flow continues to block 360 where the operation is executed (i.e., without changing from current environment). If not, the NO prong of decision 335, flow continues to block 340 where the operation may be advertised so that available and applicable execution environments may determine to take this operation. In this example embodiment, operations are advertised and then pulled (i.e., the task definition is pulled) to an execution environment. In a different embodiment, it would be possible to select and push the operation to the next execution environment. Block 345 indicates that any forward looking analysis may be updated based on changes to the compute resources within network infrastructure 100. Block 350 indicates that the handoff and transfer for the task flow information may be performed. Block 355 indicates that the current execution environment information is updated to reflect the transfer to the new execution environment. Flow continues to block 360 where the operation may be executed. While executing, as indicated by block 365, checkpoints of the operation status may be made. These checkpoints may assist to recover partial work of either the operation or the overall task flow in the event that execution is unexpectedly interrupted. Further, checkpoints may be used to communicate current status of the overall task flow. For example, to a user interface for someone monitoring the task flow progress or other task flows waiting on an operation of the overall task flow to complete (e.g., they can start prior to task flow completion and only have dependency on that operation). After the operation has completed, flow continues to decision 370 where it is determined if there are any further operations within the task flow. If the task flow is not complete, i.e., the NO prong of decision 370, flow continues to block 375 where the next operation may be obtained and then to the beginning of the loop at block 330. This process may be completed until all operations of the task flow are complete. At which point, the YES prong of decision 370, flow continues to block 380 where overall status of the task flow and each individual operation may be reported as necessary, and any logs may be collected from the disparate execution environments to make a comprehensive log set (e.g., at the customer instance) for the now completed task flow as indicated at block 385.

Figure 4:
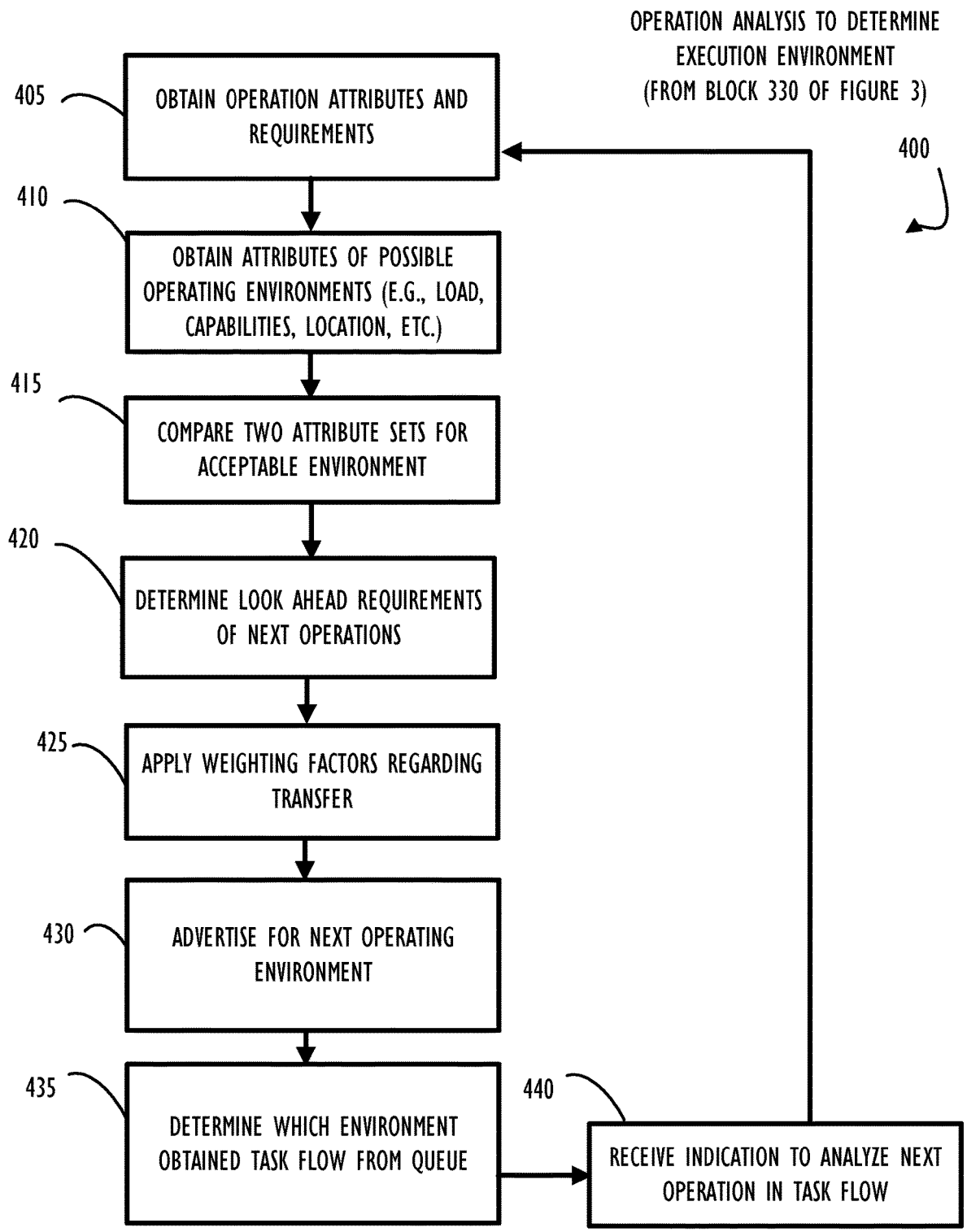
FIG. 4 is a flow chart for operation 400 illustrating one possible method for determining or adjusting different execution environments dynamically while executing different operations in a task flow according to one or more disclosed embodiments.

Turning now to FIG. 4, operation 400 is represented by a flow chart illustrating one possible method for determining or adjusting different execution environments dynamically while executing different operations in a task flow according to one or more disclosed embodiments. As explained above for box 330 for FIG. 3, there are several methods to determine the proper execution environment for the next operation of a run-time task flow while it is executing. These methods may take into account the overall definition of the task flow, capabilities of different available execution environments, and instantaneous information available at the time of transitioning from one operation to the next. As used herein, a "determined proper execution environment" (i.e., past tense) refers to the singular execution environment that actually executes the operation of the task flow, and the present tense "determine" refers to a result of a selection from an operation such as operation 400 that may result in more than one execution environment. For example, an operation like operation 400 may "determine" that it should advertise the execution availability of the operation to a set of operation environments and only one of those execution environments becomes the "determined" execution environment when it accepts that operation for execution. This distinction should also be clear from the context of the discussion.

With respect to determining a proper execution environment, operation 400 is just one possible example. Beginning at block 405 the operational attributes and requirements of the operation in question may be obtained. Block 410 indicates that attributes of all possible operating environments may be obtained. Operational environments that do not have the capability to execute the operation will not be included for further analysis and they may be eliminated. Once a set of possible and available environments are identified, instantaneous or other dynamic factors for that set may be evaluated. Block 415 indicates that a set of attributes for the operation (e.g., attributes expressing the capabilities required) may be compared against one or more sets of attributes for the possible available environments. Block 420 indicates that look ahead requirements may be considered. That is, if we are looking at operation N, then operations N+1, N+2, etc. may be included as part of this analysis for the proposition that a set of operations may be transferred to an operational execution environment for potentially several operations, thus reducing the amount of switching that occurs for a single task flow execution. Block 425 indicates that weighting factors may be applied because in some cases load parameters may be given more weight than the desire to reduce the number of environment switches. Other weighting factors may also be included and may be dynamically changed based on information learned from previous executions of this or other task flow definitions. For example, machine learning may determine that a set of operations in a task flow execute more efficiently in some execution environments rather than others. The more efficient execution environments may then be favored by adjusting the weighting factors for subsequent executions of task flow definitions. Block 430 indicates that once a set of proper execution environments is identified, the availability for an execution environment to accept this task may be advertised. Alternatively, the operation may be directly assigned to a specific execution environment based on the analysis already performed. Block 435 indicates that it is determined which environment obtained the task flow definition from the queue and began executing the operation. Flow continues to block 440 where an indication is received that another operation in a task flow is ready for analysis and flow returns to block 405 to repeat process 400. In this manner, each operation for a task flow may be dynamically assigned to the most "proper" execution environment and provide an overall optimization for the complete set of operations in the task flow definition.

Figure 5:
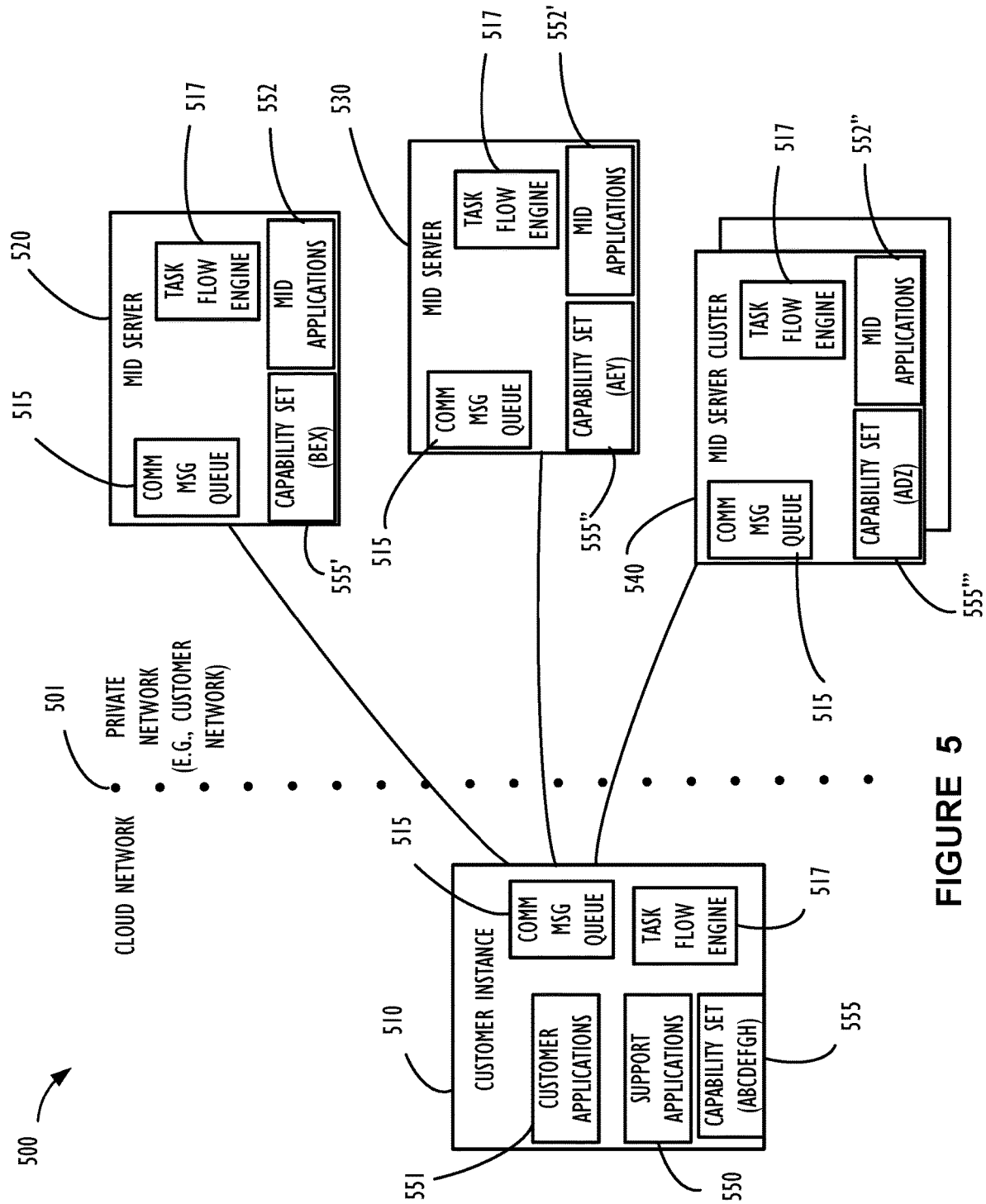
FIG. 5 is block diagram of a hybrid infrastructure 500 including a cloud-based customer instance in communication with a set of management, instrumentation, and discovery (MID) servers located within a private network (e.g., customer network) that may be configured to execute selected operations from the plurality of operations in a given task flow according to one or more disclosed embodiments.

Referring now to FIG. 5, a block diagram of a hybrid infrastructure 500 is shown. Hybrid infrastructure 500, in this example, includes a cloud-based customer instance 510 in communication with a set of management, instrumentation, and discovery (MID) servers 520, 530, and 540. The three example MID servers may be located within a private network (e.g., customer network 102). Collectively, customer instance 510 and MID servers 520, 530, and 540 make up a portion of a hybrid network for a single customer. Although only a single customer hybrid network is shown in FIG. 5, it is expected that many such hybrid networks will be concurrently active and supported by a single cloud service provider network 110. In the example of FIG. 5, dotted line 501 indicates a separation of networks, such that elements to the left of line 501 are located within a cloud network (e.g., cloud service provider network 110) and elements to the right of line 501 are located within a private network (e.g., customer network). Each MID server 520, 530, and 540 may be selected to execute different operations from the plurality of operations in a given task flow based on their operational capabilities and the requirements of a given operation, according to one or more disclosed embodiments. In this example, block 555 indicates that customer instance 510 has a capability set to perform operations of types ABCDEFGH. Block 555' indicates that MID server 520 has a capability set of BEX. Block 555'' indicates that MID server 530 has a capability set of AEY. Block 555''' indicates that MID server cluster 540 has a capability set of ADZ. In this example, each letter is used to indicate a capability, and the collective set of letters represents all the types of functions that may be performed on such environment. Accordingly, an operation of type A may be executed on customer instance 510, or MID servers 530, 540 and not executed on MID server 520 because MID server 520 does not have type A operations in its capability set 555'. Similarly, type B operations must execute either on customer instance 510 or MID server 520. As shown in this example, it is not uncommon for a customer instance to have a larger capability set than any given MID server. Likewise, it is not uncommon for specific MID servers to have capabilities that may not be executed anywhere but on that particular MID server. Clearly, these capability sets are just examples and other possible capability sets may exist.

In the example of hybrid infrastructure 500, customer instance 510 also includes customer applications 551, and support applications 550. Customer instance 510, and each of MID servers 520, 530, and 540, further include a task flow engine 517 and a communication message queue 515. Finally, MID server 520 includes MID applications 552, MID server 430 includes MID applications 552', and MID server cluster 540 includes MID applications 552''. It is these configuration attributes that play a part in determining the capability set of each of the compute resources of hybrid infrastructure 500. That is, existence of a particular application or access to a particular data source may give a MID server or the customer instance a capability not available in another execution environment. Accordingly, attributes of the operating environment may be used in conjunction with attributes of a given operation to find an appropriate match when determining a proper execution environment for that given operation.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application

What is claimed is:

1. A system comprising:
processing circuitry; and
memory, accessible by the processing circuitry, wherein the memory comprises instructions that, when executed by the processing circuitry, cause the processing circuitry to perform operations comprising:
obtaining a task flow definition comprising a plurality of operations configured to be executed sequentially in a single thread;
analyzing the plurality of operations to identify respective attributes for each operation of the plurality of operations;
grouping a first set of operations of the plurality of operations with one another and a second set of operations of the plurality of operations with one another based on the respective attributes of each operation to reduce a number of switches between a first execution environment and a second execution environment;
executing the first set of operations of the plurality of operations in the first execution environment; and
executing the second set of operations of the plurality of operations in the second execution environment after executing the first set of operations in the first execution environment.

2. The system of claim 1, wherein the first execution environment comprises an instance environment, wherein the second execution environment comprises a server environment disposed in a customer private network, and wherein the server environment is communicatively coupled to the instance environment.

3. The system of claim 2, wherein the task flow definition is obtained from the instance environment.

4. The system of claim 2, wherein a greater number of the plurality of operations are executed in the server environment than are executed in the instance environment.

5. The system of claim 1, wherein the second execution environment is authorized to access data inaccessible to the first execution environment and has different execution capabilities than the first execution environment.

6. The system of claim 1, wherein the operations comprise:
providing the respective attributes for each operation of the plurality of operations to the first execution environment and the second execution environment.

7. The system of claim 6, wherein the operations comprise:
executing the first set of operations in the first execution environment based on a comparison of one or more first execution capabilities of the first execution environment and the respective attributes of each operation of the first set of operations; and
executing the second set of operations in the second execution environment based on an additional comparison of one or more second execution capabilities of the second execution environment and the respective attributes of each operation of the second set of operations.

8. The system of claim 1, wherein the respective attributes of each operation of the first set of operations and the second set of operations comprise a data access requirement, an authorization credential requirement, an application availability requirement, or any combination thereof.

9. The system of claim 1, wherein the operations comprise:
executing remaining operations of the plurality of operations in either the first execution environment or the second execution environment based on the respective attributes for each operation of the remaining operations while reducing the number of switches between the first execution environment and the second execution environment.

10. A method comprising:
obtaining a task flow definition comprising a plurality of operations configured to be executed sequentially in a single thread;
analyzing the plurality of operations to identify respective attributes for each operation of the plurality of operations;
grouping a first set of operations of the plurality of operations with one another and a second set of operations of the plurality of operations with one another based on the respective attributes of each operation to reduce a number of switches between a first execution environment and a second execution environment;
executing the first set of operations of the plurality of operations in the first execution environment; and
executing the second set of operations of the plurality of operations in the second execution environment after executing the first set of operations in the first execution environment.

11. The method of claim 10, wherein the first execution environment comprises an instance environment, wherein the second execution environment comprises a server environment disposed in a customer private network, and wherein the server environment is communicatively coupled to the instance environment.

12. The method of claim 11, wherein a greater number of the plurality of operations are executed in the server environment than are executed in the instance environment.

13. The method of claim 10, comprising providing the respective attributes for each operation of the plurality of operations to the first execution environment and the second execution environment.

14. The method of claim 13, comprising:
executing the first set of operations in the first execution environment based on a first comparison of one or more execution capabilities of the first execution environment and the respective attributes of each operation of the first set of operations; and
executing the second set of operations in the second execution environment based on a second comparison of one or more additional execution capabilities of the second execution environment and the respective attributes of each operation of the second set of operations.

15. The method of claim 14, comprising executing one or more remaining operations of the plurality of operations in either the first execution environment or the second execution environment based on an additional comparison of the one or more execution capabilities of the first execution environment and the one or more additional execution capabilities of the second execution environment and the respective attributes of each operation of the one or more remaining operations.

16. A tangible, non-transitory, computer-readable medium storing instructions that, when executed by processing circuitry, cause the processing circuitry to perform operations comprising:
- obtaining a task flow definition comprising a plurality of operations configured to be executed sequentially in a single thread;
- analyzing the plurality of operations to identify respective attributes for each operation of the plurality of operations;
- grouping a first set of operations of the plurality of operations with one another and a second set of operations of the plurality of operations with one another based on the respective attributes of each operation to reduce a number of switches between a first execution environment and a second execution environment;
- executing the first set of operations of the plurality of operations in the first execution environment; and
- executing the second set of operations of the plurality of operations in the second execution environment after executing the first set of operations in the first execution environment.

17. The computer-readable medium of claim 16, wherein the first execution environment comprises an instance environment, wherein the second execution environment comprises a server environment disposed in a customer private network, and wherein the server environment is communicatively coupled to the instance environment, and wherein the server environment is authorized to access data inaccessible to the instance environment.

18. The computer-readable medium of claim 17, wherein the server environment is provided by network infrastructure that is remote from the processing circuitry.

19. The computer-readable medium of claim 16, wherein the operations comprise:
- providing the respective attributes for each operation of the plurality of operations to the first execution environment and the second execution environment.

20. The computer-readable medium of claim 16, wherein the respective attributes of each operation of the plurality of operations comprise a data access requirement, an authorization credential requirement, an application availability requirement, or any combination thereof.

* * * * *